May 5, 1964

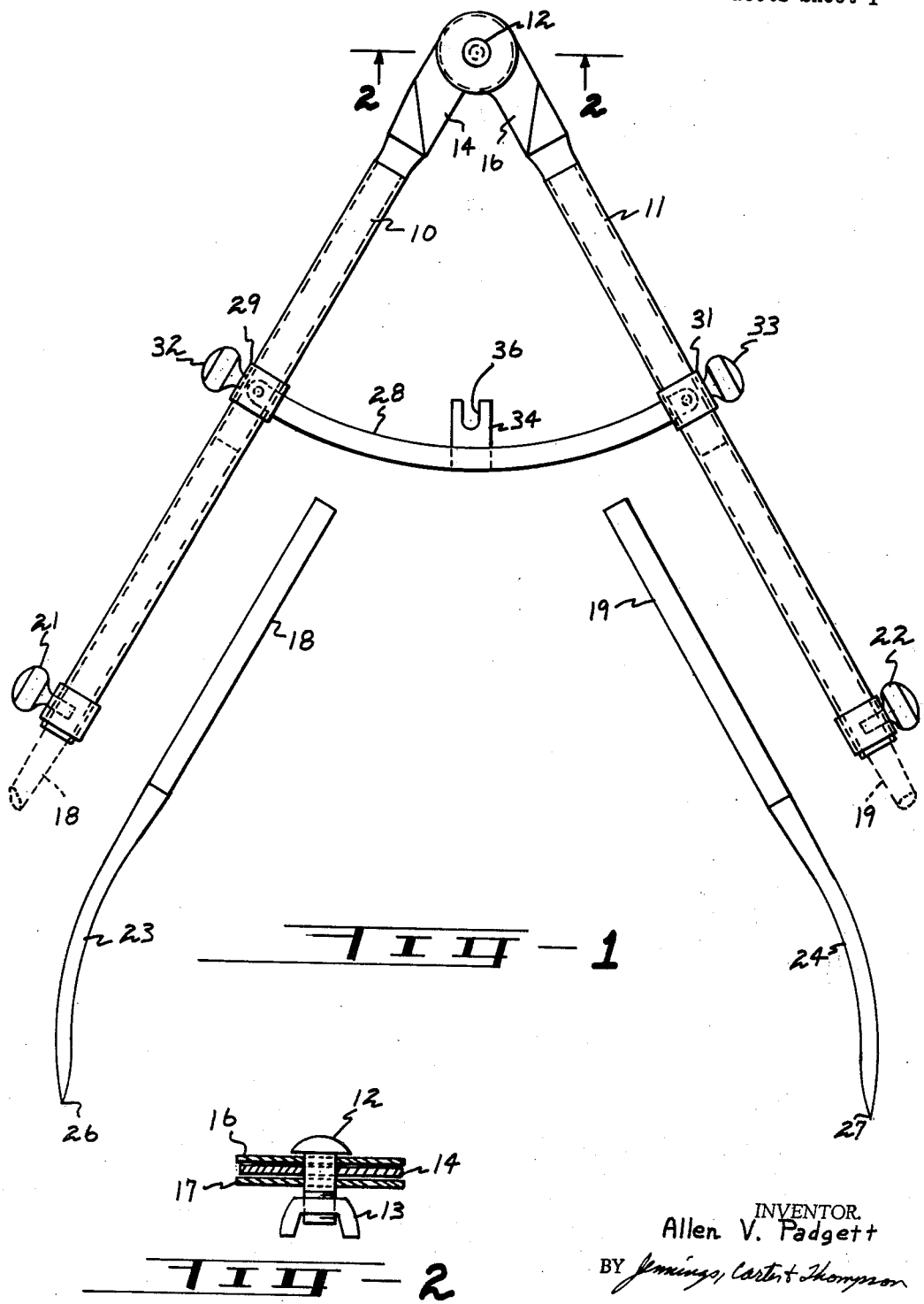

A. V. PADGETT 3,131,481

GAUGE FOR DETERMINING THE ALIGNMENT OF A VEHICLE BODY

Filed Feb. 7, 1962

INVENTOR.
Allen V. Padgett
BY Jennings, Carter & Thompson

Attorneys 3,131,481
GAUGE FOR DETERMINING THE ALIGNMENT
OF A VEHICLE BODY
Allen V. Padgett, Birmingham, Ala., assignor to J. P.
Company, Inc., a corporation of Alabama
Filed Feb. 7, 1962, Ser. No. 171,696
2 Claims. (Cl. 33—152)

This invention relates to a gauge for determining the alignment of a vehicle body and more particularly to such a gauge which shall be adapted for determining the degree of misalignment of the vehicle body without having to remove obstructions which usually exist between the various reference or datum points on the vehicle body.

An object of my invention is to provide a gauge for determining the alignment of a vehicle body of the character designated in which the degree of twist in a vehicle frame or body may be readily ascertained in an accurate manner and with a minimum of effort.

A further object of my invention is to provide a gauge for determining the alignment of a vehicle body of the character designated which shall be adjustable and include quick-acting means for securing the various parts of the gauge at selected positions relative to each other.

A still further object of my invention is to provide a gauge for determining the alignment of a vehicle body of the character designated which shall be simple of construction, economical of manufacture and one which is light in weight and requires a minimum of storage space due to the fact that the gauge is collapsible.

A gauge embodying features of my invention is illustrated in the accompanying drawings, forming a part of this application, in which:

FIG. 1 is an elevational view showing the gauge with the extensible members removed therefrom;

FIG. 2 is an enlarged sectional view taken generally along the line 2—2 of FIG. 1;

Figure 5:
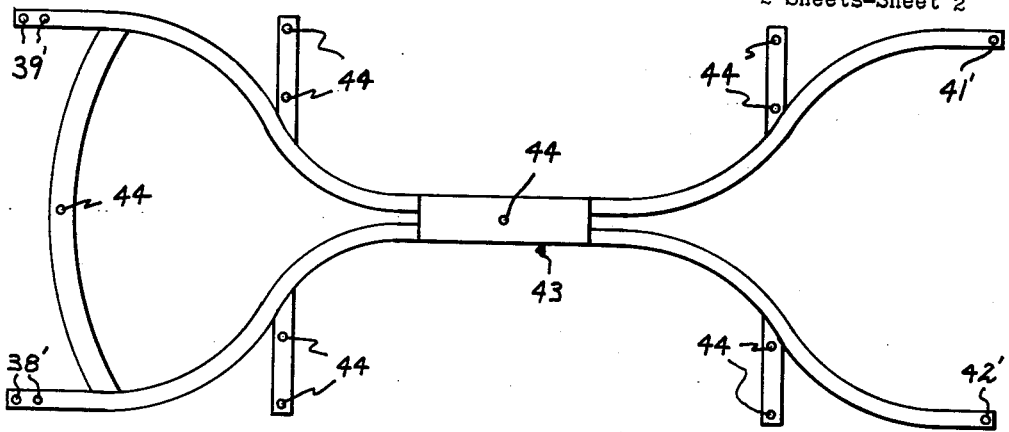

Referring now to the drawings for a better understanding of my invention, my improved gauge comprises a pair of outwardly projecting arms 10 and 11 having adjacent ends thereof pivotally connected to each other by a wing bolt 12 having a wing nut 13. As shown in FIGS. 1 and 2, the pivoted ends of the arms 10 and 11 are relatively flat. The flat end of the arm 10 is indicated at 14 and is adapted to fit between flat members 16 and 17 which define a bifurcated end portion for the arm 11, as shown in FIG. 2.

Figure 3:
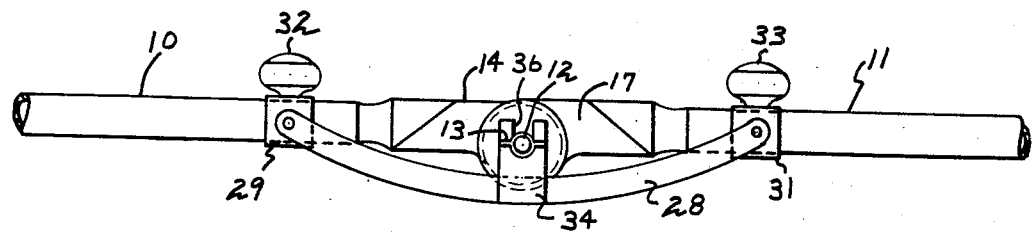
FIG. 3 is a fragmental view showing the opposite side of the gauge from that shown in FIG. 1 and showing the arms of the gauge extending in longitudinal alignment with each other, together with means for locking the arms in this position.

The arms 10 and 11 are tubular in shape outwardly of the flat end portions 14, 16 and 17 as shown in FIGS. 1 and 3. While I show the cross sectional shape of the tubular portions of the arms 10 and 11 as being generally cylindrical, it will be apparent that the cross sectional shape may be square, triangular or of any other desired shape.

Telescoping within the outer ends of the arms 10 and 11 are extensible members 18 and 19, respectively. The extensible members 18 and 19 may be of any desired length and are locked in selective positions relative to the arms 10 and 11 by set screws 21 and 22, respectively. That is, the effective length of the gauge may be varied by moving the extensible members 18 and 19 relative to the arms 10 and 11 and then locking the extensible members in a selected position by the set screws 21 and 22. The outer end portions of the extensible members 18 and 19 may be of any desired shape. Preferably, the outer ends of the extensible members 18 and 19 are curved as at 23 and 24 whereby the extensible members may be rotated relative to the arms 10 and 11 to adapt the gauge for both inside and outside measurements and to further adapt the gauge for the measurement of differences between datum points located at inconvenient locations on a vehicle frame or body. The free ends of the extensible members 18 and 19 are pointed as at 26 and 27 to provide for more accurate measurement between selected datum points on the vehicle body.

While I show the set screws 21 and 22 as extending outwardly of the arms 10 and 11 in a horizontal plane, as viewed in FIG. 1, it will be apparent that the set screws 21 and 22 could be so mounted that they would extend at any selected angular position relative to the arms 10 and 11 thereby positioning the set screws whereby they do not interfere with measurements in close places.

To lock the arms 10 and 11 in selected angular positions relative to each other whereby the points 26 and 27 are positioned at a set distance from each other, I provide a transverse member 28 which extends between the arms 10 and 11, as shown in FIGS. 1 and 3. Mounted at opposite ends of the transverse member 28 are sleeve members 29 and 31 which are adapted to engage the arms 10 and 11, respectively, with a sliding fit. The sleeve members 29 and 31 are held at selected positions relative to the arms 10 and 11 by set screws 32 and 33, respectively. Accordingly, the arms 10 and 11 are adapted for angular movement over a relatively wide range.

In FIG. 3 of the drawings, I show the arms 10 and 11 as extending in axial alignment with each other. To lock the arms 10 and 11 in this position, I mount an inwardly extending bracket 34 adjacent the center of the transverse member 28. An inwardly opening slot 36 is provided in the bracket 34 for receiving the wing bolt 12 when the arms 10 and 11 are moved into axial alignment with each other. That is to say, the wing nut 13 is moved in spaced relation to the flat portion 17 of the arm 11, as shown in FIG. 2, whereby the inwardly extending bracket 34 is adapted to move between the wing nut 13 and the flat member 17, as shown in FIG. 3. After the bracket 34 is moved to this position, the wing nut 13 is tightened whereby the bracket 34 is secured in place by the bolt 12 to thus hold the arms 10 and 11 in the position shown in FIG. 3.

Figure 4:
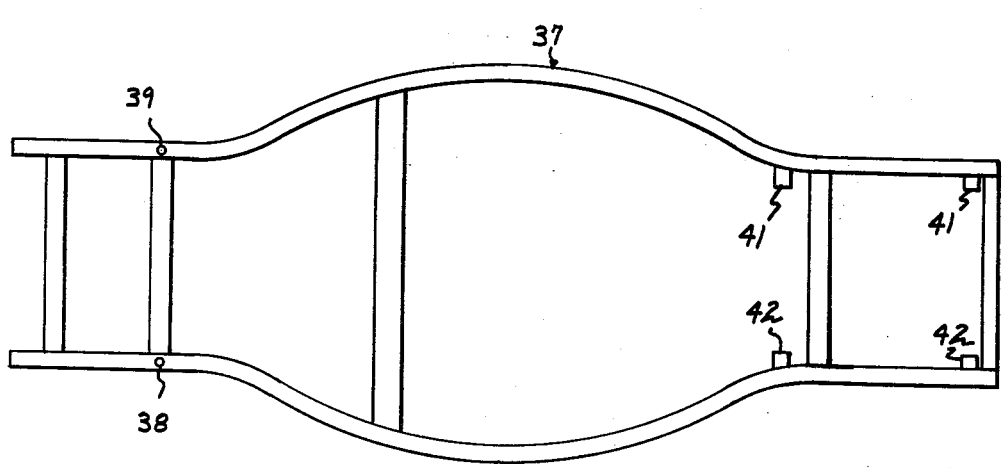
FIG. 4 is a top plan view showing a conventional type vehicle frame and the datum points thereon; and, FIG. 5 is a top plan view of another conventional type vehicle frame showing the datum points thereon.

As is well known in the art to which my invention relates, vehicle bodies are provided with a plurality of datum points. For example, with the box-type frame 37 shown in FIG. 4, datum points 38 and 39, in the form of rivets, are provided at opposite sides of the forward end of frame 37. The spring shackles 41 and 42 at opposite sides of the rear portion of the frame 37 may serve as datum points. To determine the amount of twist in the frame 37, I adjust the arms 10 and 11 of the gauge to an angular position whereby the point 26 is in register with the datum point 39 while the point 27 is in register with a datum point 42. The arms 10 and 11 are then locked in this position by tightening the set screws 32 and 33. With the instrument thus set in this position, the point 26 is positioned in register with the datum point 38 and the point 27 is moved toward a datum point 41 directly opposite the datum point 42 employed for the first measurement. If the point 27 does not register with the datum point 41, there is twist in the frame. In other words, the amount of twist in the frame is equal to the difference in the two measurements made between datum points 39—42 and datum points 38—41.

In FIG. 5 of the drawing, I show a conventional type X frame 43 which is provided with datum points 38' and 39' at opposite sides of the forward portion of the frame. Datum points 41' and 42' are provided adjacent the rear of the frame 43 whereby the amount of twist in the frame may be determined as described hereinabove with reference to the box type frame 37.

It will be apparent that a plurality of other reference points 44 may be provided on the frames 37 and 43 at various locations whereby misalignment of the frame may be accurately determined with my improved gauge. For example, the distance between a pair of datum points at one side of the frame is measured and then the arms 10 and 11 are locked in this position by the set screws 32 and 33. A measurement between corresponding datum points at the opposite side of the frame is then made to determine whether or not there is any misalignment of the frame or body. Also, measurements may be made from datum points 44 adjacent the center of the frame to datum points adjacent the sides of the frame whereby misalignment is determined. That is to say, the difference from a centrally located datum point to corresponding datum points at opposite sides of the frame should be equal to each other. If these points are not equal, the frame is straightened until the distances are equal. Also, my improved gauge may be employed to determine whether or not the various portions of the vehicle body located above the frames are in true alignment by measuring the distance between a first pair of datum points and then measuring the distance between a second pair of corresponding datum points. A difference in these measurements indicates that there is misalignment.

From the foregoing, it will be seen that I have devised an improved datum gauge for determining whether or not a vehicle body is misaligned. By providing a datum gauge which may be readily adjusted to selected positions to measure the distance between any selected pair of datum points, I greatly facilitate the process of determining whether or not a vehicle body is misaligned. By providing adjustable arms having extensible members thereon which are adapted to rotate to selected positions and then be locked in the selected positions, my gauge is particularly adapted for measuring distances between datum points where obstructions exist between the datum points. That is, the distance between datum points usually cannot be measured without removing parts of the vehicle, such as parts of the driving unit, radiators, seats and the like. Accordingly, to make a relatively simple alignment check, it is often necessary to remove parts of the vehicle for the sole purpose of making the check. After the alignment check has been made, the parts must be installed again, thus consuming a considerable amount of time and effort and at the same time greatly increasing the cost of straightening vehicle frames and bodies.

While I have shown the extensible members 18 and 19 as being curved as at 23 and 24, it will be apparent that the extensible members may be of various shapes whereby the instrument may be adapted for reaching datum points at inaccessible locations. For example, the outer ends of the extensible members 18 and 19 may be straight, curved or bent at angular positions.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. An alignment gauge for a vehicle body comprising:
 (a) a pair of outwardly projecting arms,
 (b) a bolt and nut assembly pivotally connecting adjacent ends of said arms to each other,
 (c) extensible members carried by the other ends of said arms,
 (d) a transverse member extending between said arms,
 (e) guide members carried by said transverse member disposed to engage said arms with a sliding fit,
 (f) means locking said guide members to said arms at selected positions to hold said arms at selected angular positions relative to each other and position the ends of said extensible members at selected distances from each other whereby alignment measurements may be made between selected datum points of a vehicle body,
 (g) an inwardly projecting bracket carried by said transverse member in position to move into engagement with said bolt when said arms are moved to a position in substantially longitudinal alignment with each other, and
 (h) there being an inwardly opening slot in said bracket disposed to receive said bolt whereby upon tightening the nut on said bolt with said bracket engaging the bolt said bracket is secured in place by said bolt.
2. An alignment gauge for a vehicle body as defined in claim 1 in which at least one of the extensible members is bent and adapted for rotation to selected positions relative to said arms and locking means is provided to lock said extensible members in selected positions.

References Cited in the file of this patent
UNITED STATES PATENTS

| | | |
|---|---|---|
| 888,498 | Henrikson | May 26, 1908 |
| 1,109,467 | Robinson | Sept. 1, 1914 |
| 1,237,132 | Whyte | Aug. 14, 1917 |
| 1,998,352 | Bachmann | Apr. 16, 1935 |
| 2,086,402 | Countryman | July 6, 1937 |

FOREIGN PATENTS

| | | |
|---|---|---|
| 178,492 | Germany | Nov. 15, 1906 |